US008989553B2

(12) United States Patent
Chang et al.

(10) Patent No.: US 8,989,553 B2
(45) Date of Patent: Mar. 24, 2015

(54) VIDEO PROCESSING SYSTEM AND VIDEO PROCESSING METHOD

(71) Applicant: Innotive Inc. Korea, Seoul (KR)

(72) Inventors: Peter Taehwan Chang, Seoul (KR); Dae Hee Kim, Seoul (KR); Kyung Hun Kim, Seoul (KR); Jun Seok Lee, Seoul (KR); Jae Sung Chung, Seoul (KR)

(73) Assignee: Innotive Inc. Korea, Seoul (KR)

( * ) Notice: Subject to any disclaimer, the term of this patent is extended or adjusted under 35 U.S.C. 154(b) by 0 days.

(21) Appl. No.: 13/921,650

(22) Filed: Jun. 19, 2013

(65) Prior Publication Data

US 2013/0279871 A1 Oct. 24, 2013

Related U.S. Application Data

(63) Continuation-in-part of application No. 12/812,121, filed as application No. PCT/KR2009/000148 on Jan. 12, 2009, now abandoned.

(30) Foreign Application Priority Data

Jan. 12, 2008 (KR) .................. 10-2008-0003703

(51) Int. Cl.
*H04N 5/77* (2006.01)
*H04N 9/804* (2006.01)
*H04N 5/765* (2006.01)
*H04N 21/2187* (2011.01)
*H04N 21/2343* (2011.01)
(Continued)

(52) U.S. Cl.
CPC ............ *H04N 9/8042* (2013.01); *H04N 5/765* (2013.01); *H04N 5/772* (2013.01); *H04N 21/2187* (2013.01); *H04N 21/2343* (2013.01); *H04N 21/234327* (2013.01); *H04N 21/234363* (2013.01); *H04N 21/234381* (2013.01); *H04N 21/258* (2013.01); *H04N 21/25808* (2013.01); *H04N 21/2665* (2013.01)

USPC ........................................... 386/224; 386/210

(58) Field of Classification Search
None
See application file for complete search history.

(56) References Cited

U.S. PATENT DOCUMENTS

| 8,004,558 B2 | 8/2011 | Prechtl et al. |
| 2005/0021620 A1* | 1/2005 | Simon et al. ................. 709/204 |

(Continued)

FOREIGN PATENT DOCUMENTS

| KR | 10-2005-0001153 | 1/2005 |
| KR | 10-0504133 | 7/2005 |

(Continued)

*Primary Examiner* — William C Vaughn, Jr.
*Assistant Examiner* — Eileen Adams
(74) *Attorney, Agent, or Firm* — Occhiuti & Rohlicek LLP

(57) ABSTRACT

A video processing system includes: a merge server configured to decode a plurality of individual videos provided from video providing units, encode the plurality of individual videos by adjusting an amount of data of each of the individual videos to generate a preliminary video, and provide the preliminary video; a display server configured to receive the preliminary video and configure final videos according to output conditions of a display device; and a control server configured to receive the output conditions from the display server and transfer an output control signal with respect to the preliminary video to the merge server. When a user wants, individual videos provided from the plurality of video providing units can be displayed on a display device without sacrificing resolution and a frame rate, and since videos can be zoomed in/out and panned in real time, operational responsiveness and usage efficiency of the video processing system can be enhanced.

17 Claims, 11 Drawing Sheets

(51) Int. Cl.
*H04N 21/258* (2011.01)
*H04N 21/2665* (2011.01)

(56) References Cited

U.S. PATENT DOCUMENTS

2007/0040909 A1 2/2007 Chang
2007/0182819 A1 8/2007 Monroe
2007/0291233 A1* 12/2007 Culbertson et al. ............. 353/34
2013/0271651 A1* 10/2013 Sullivan, Gary J. .......... 348/441

FOREIGN PATENT DOCUMENTS

KR 10-2007-0020658 2/2007
KR 10-2007-0015724 6/2007

* cited by examiner

FIG. 3

| | | | M | | |
|---|---|---|---|---|---|
| 1 | 2 | 3 | 4 | 5 | 6 |
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

C1 = column 1, C2 = column 2

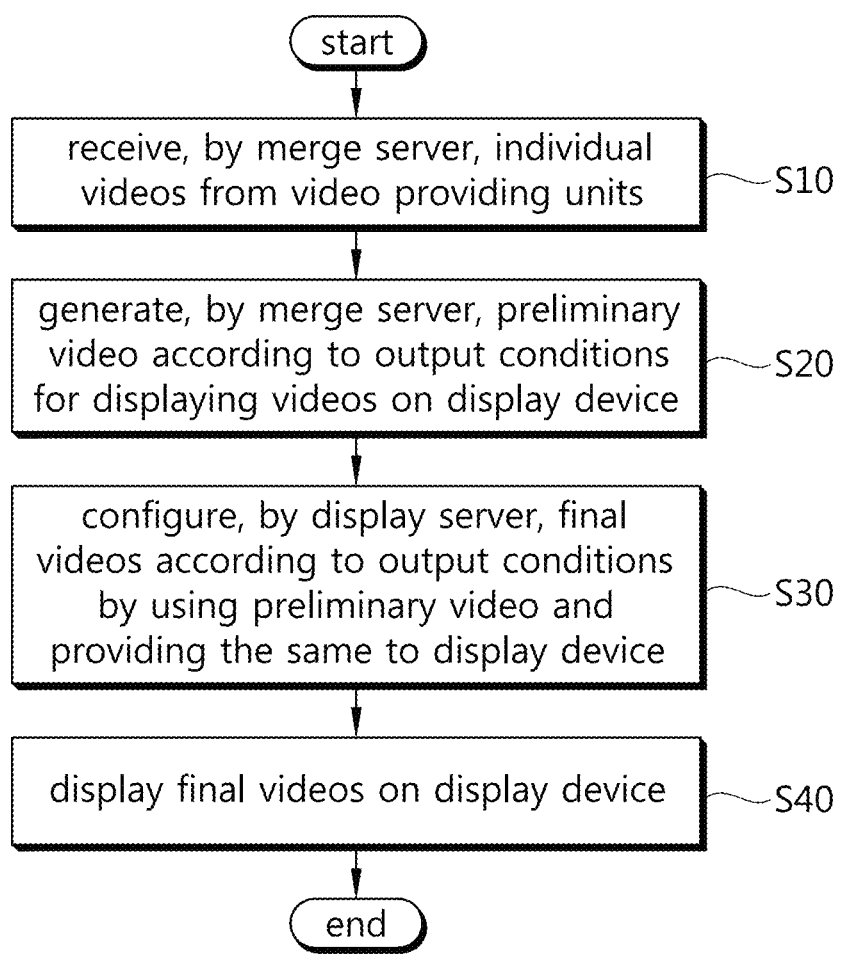

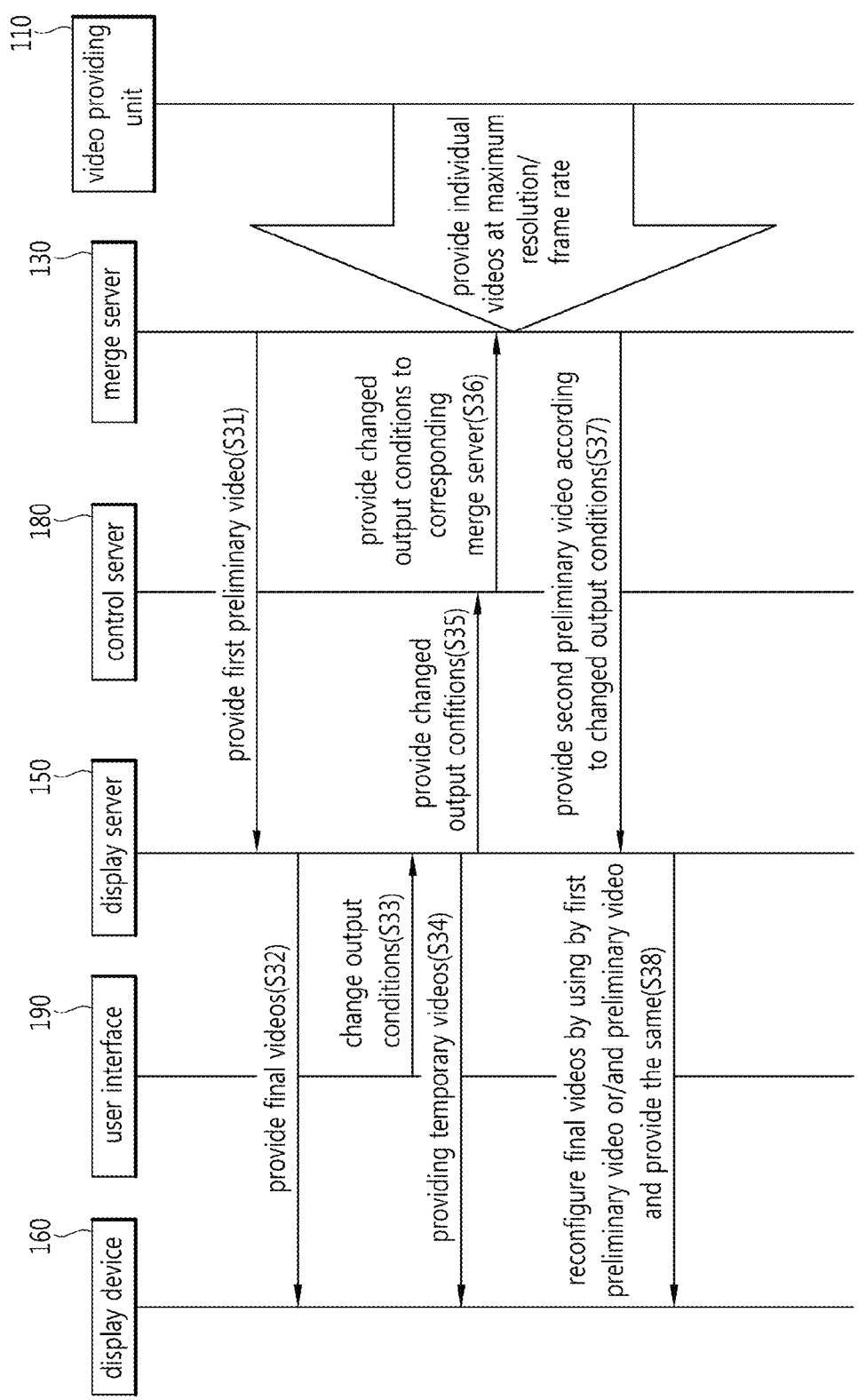

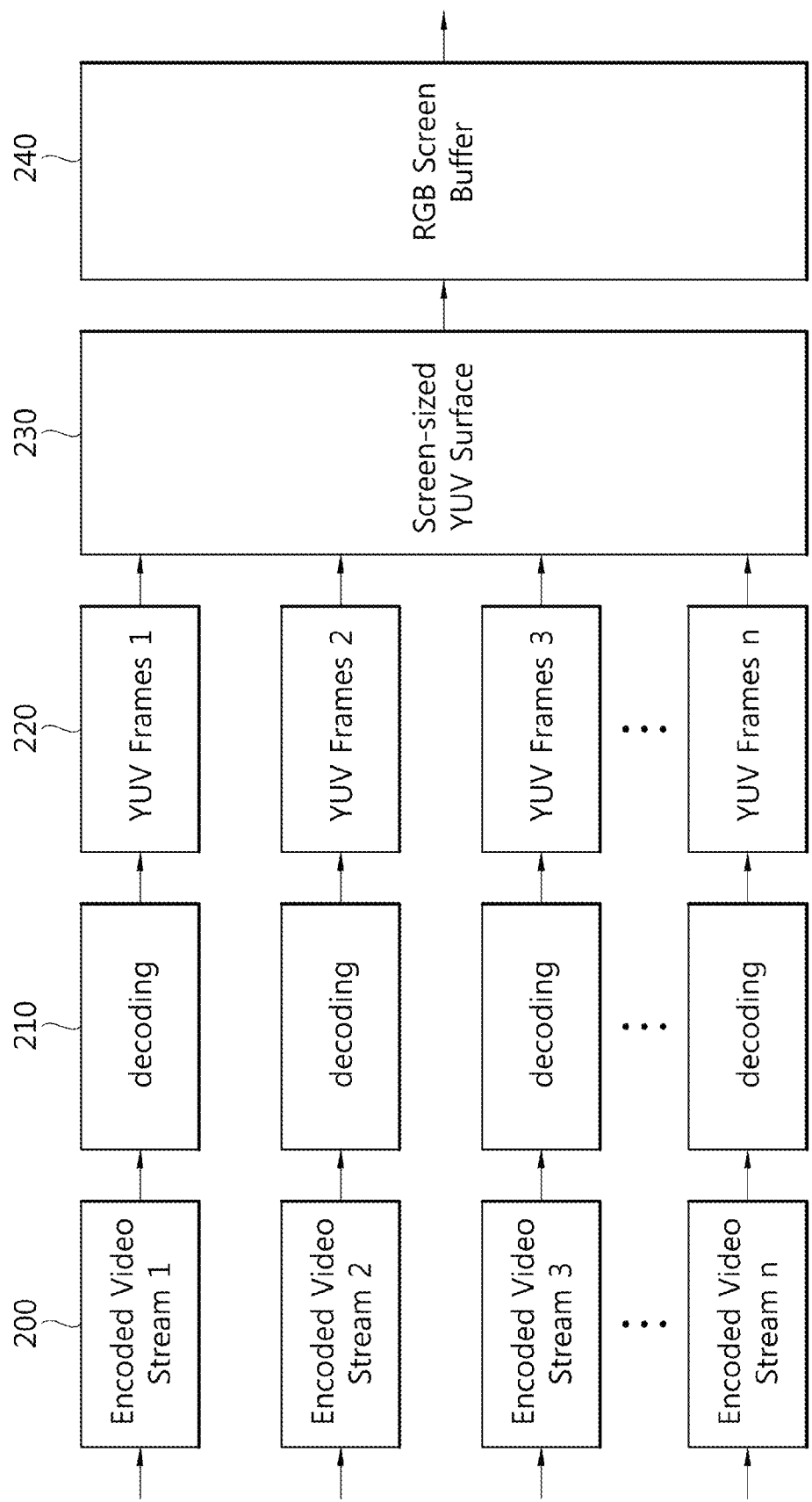

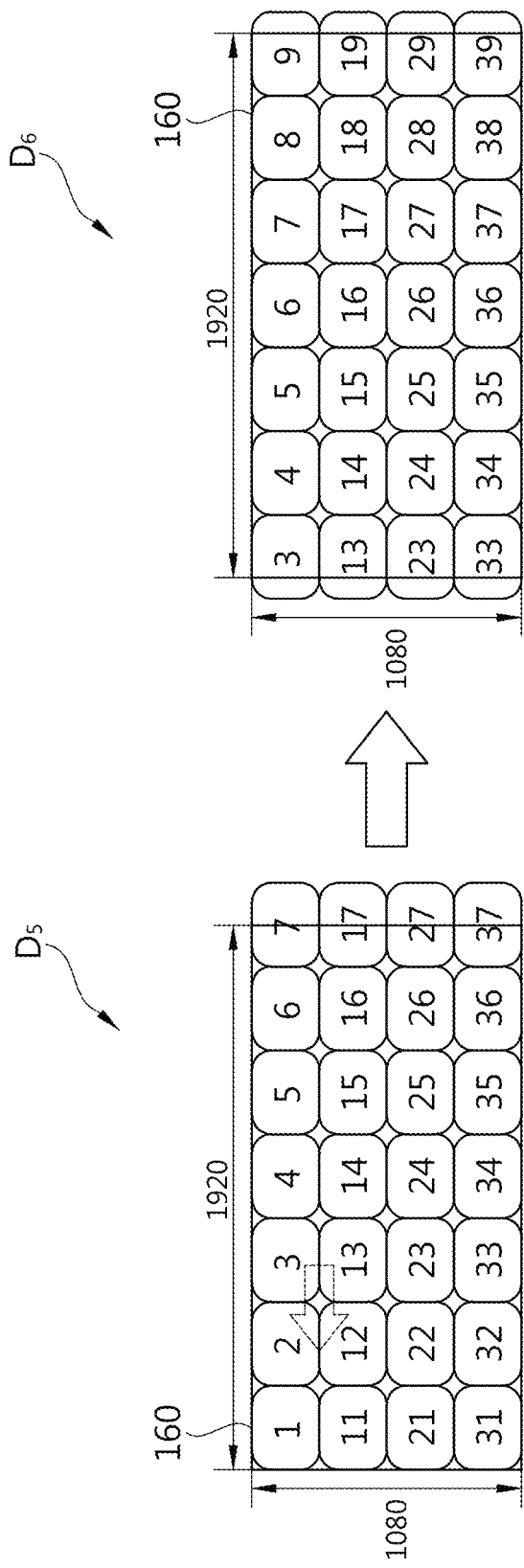

VIDEO PROCESSING SYSTEM AND VIDEO PROCESSING METHOD

CROSS REFERENCE TO RELATED APPLICATIONS

This application is a continuation-in-part of U.S. application Ser. No. 12/812,121, filed on Aug. 3, 2010, which is the National Stage of International Application No. PCT/KR2009/000148, filed on Jan. 12, 2009, which claims the priority date of Korean Application No. 10-2008-0003703, filed on Jan. 12, 2008 the contents of which are hereby incorporated by reference in their entirety.

BACKGROUND OF THE INVENTION

1. Field of the Invention

The present invention relates to a video processing system and a video processing method, and more particularly, to a video processing system for displaying videos (or images) captured by a plurality of cameras under various output conditions, and a video processing method.

2. Related Art

A monitoring system refers to a system of storing videos, captured by a plurality of video providing units (e.g., IP cameras) installed to be spaced apart from one another at different locations, in a recording device, and outputting the captured videos to a display device, thus performing monitoring with small human power beyond temporal, spatial restrictions.

A user of the monitoring system views respective videos captured by the plurality of video providing units through one or a plurality of display devices, and in order to effectively control and utilize such a monitoring system, it is required to effectively display videos provided from the plurality of video providing units in the display devices.

A related art monitoring system includes a video providing unit, a server, and a display device. The video providing unit serves to capture a video, compress the captured video, and provide the compressed video to the server. In general, a plurality of video providing units are provided. The server receives a video stream from the video providing unit, processes the received video stream, and provides the processed video stream to the display device. The plurality of video providing units and the server are connected via a network.

However, in the related art monitoring system, the increase in the amount of video providing units causes a problem. Namely, although the video providing units capture a video with high resolution at a high frame rate, it is difficult for the video providing units to transmit the video to the server. The reason is because, when traffic is increased due to the increase in the amount of video providing units, a transmission bandwidth of a network is limited.

Also, although videos can be transmitted between the plurality of video providing units and the servers via the network, processing capability of the server is at issue. In order for the server to provide video information to the display device, videos should undergo a decoding/resizing/rendering process, but in this case, if an excessive amount of videos are provided, it may exceed a limitation of a central processing unit (CPU).

Thus, in the related art monitoring system, the increase in the amount of video providing units makes it difficult for the display device to display videos with high resolution at a high frame rate provided by the video providing units.

Also, when output conditions of video displayed on the display device are changed, for example, when a user wants to change output conditions of video, through zoom-in, zoom-out, panning, or the like, video under the changed output conditions cannot be processed in real time without sacrificing resolution/frame rate.

SUMMARY OF THE INVENTION

It is, therefore, an object of the present invention to provide a video processing system capable of displaying video while maintaining maximum resolution and frame rate of video providing units while reducing a limitation to a bandwidth of a network or processing capability of a server that processes video although a large number of video providing units are provided, and a video processing method.

Another object of the present invention is to provide a video processing system capable of displaying video captured by a plurality of video providing units, under various output conditions in real time, while maintaining resolution and a frame rate of the video providing units, and a video processing method.

According to a first aspect of the present invention, a video processing system includes: a merge server configured to decode a plurality of individual videos provided from video providing units, encode the plurality of individual videos by adjusting an amount of data of each of the individual videos to generate a preliminary video, and provide the preliminary video; a display server configured to receive the preliminary video and configure final videos according to output conditions of a display device; and a control server configured to receive the output conditions from the display server and transfer an output control signal with respect to the preliminary video to the merge server.

According to a second aspect of the present invention, a video processing method includes: receiving a plurality of individual videos from video providing units; encoding the individual videos into a preliminary video according to output conditions of a display device; receiving the preliminary video and configuring final videos according to the output conditions; and displaying the final videos on the display device.

According to a third aspect of the present invention, a merge server includes: a merge server input unit configured to receive a plurality of individual videos from the outside; a first preliminary video generating unit configured to receive the individual videos from the merge server input unit and generate a first preliminary video obtained by encoding the plurality of individual videos such that the plurality of individual videos are all included and an amount of data thereof is reduced to be smaller than that of the original amount of data; a second preliminary video generating unit configured to receive the individual videos from the merge server input unit and generate a second preliminary video obtained by encoding only individual videos to be displayed on a display device, among the plurality of individual videos, according to output conditions of the display device; and a merge server controller configured to provide a control signal for selecting at least one of the first preliminary video generating unit and the second preliminary video generating unit, the control signal satisfying the output conditions.

According to a fourth aspect of the present invention, a display server includes: a display server input unit configured to receive a preliminary video from the outside; a final video generating unit configured to receive the preliminary video and generate final videos according to output conditions of a display device; a temporary video generating unit configured to generate temporary videos partially satisfying changed output conditions when the output conditions are changed;

and a display server controller configured to provide a control signal to the final video generating unit and the temporary video generating unit to output any one of final videos and temporary videos, the control signal being determined according to the output conditions.

According to embodiments of the present invention, since the merge server generates a preliminary video as preliminary video data according to various output conditions and provides the same to the display server and the display server configures videos by using the preliminary video according to the output conditions, a plurality of videos exceeding capacity for the display server to handle can be displayed.

Also, corresponding videos can be zoomed in, zoomed out, or panned in real time according to a user request, and in this process, the corresponding videos can be displayed without sacrificing resolution or a frame rate.

In addition, when output conditions of the display device are changed, the display server temporarily provides temporary videos partially satisfying the changed output conditions, receives a preliminary video satisfying the changed output conditions from the merge server in the interim, and reconfigures and outputs videos, whereby videos output to the display device are continuously reproduced (or played) without a delay time.

BRIEF DESCRIPTION OF THE DRAWINGS

The above and other objects and features of the present invention will become apparent from the following description of preferred embodiments given in conjunction with the accompanying drawings, in which:

FIG. 3 is a view illustrating a merged video M.

FIG. 5 is a flow chart illustrating a video processing method according to an embodiment of the present invention.

FIG. 6A is a view illustrating a video processing procedure among a display server, a merge server, and a control server in the video processing method according to an embodiment of the present invention.

FIG. 6B is a view illustrating a video processing procedure in the display server in the video processing method according to an embodiment of the present invention.

FIG. 9 is a view illustrating a case of panning final videos of the display device.

DETAILED DESCRIPTION OF THE EMBODIMENTS

Figure 1:
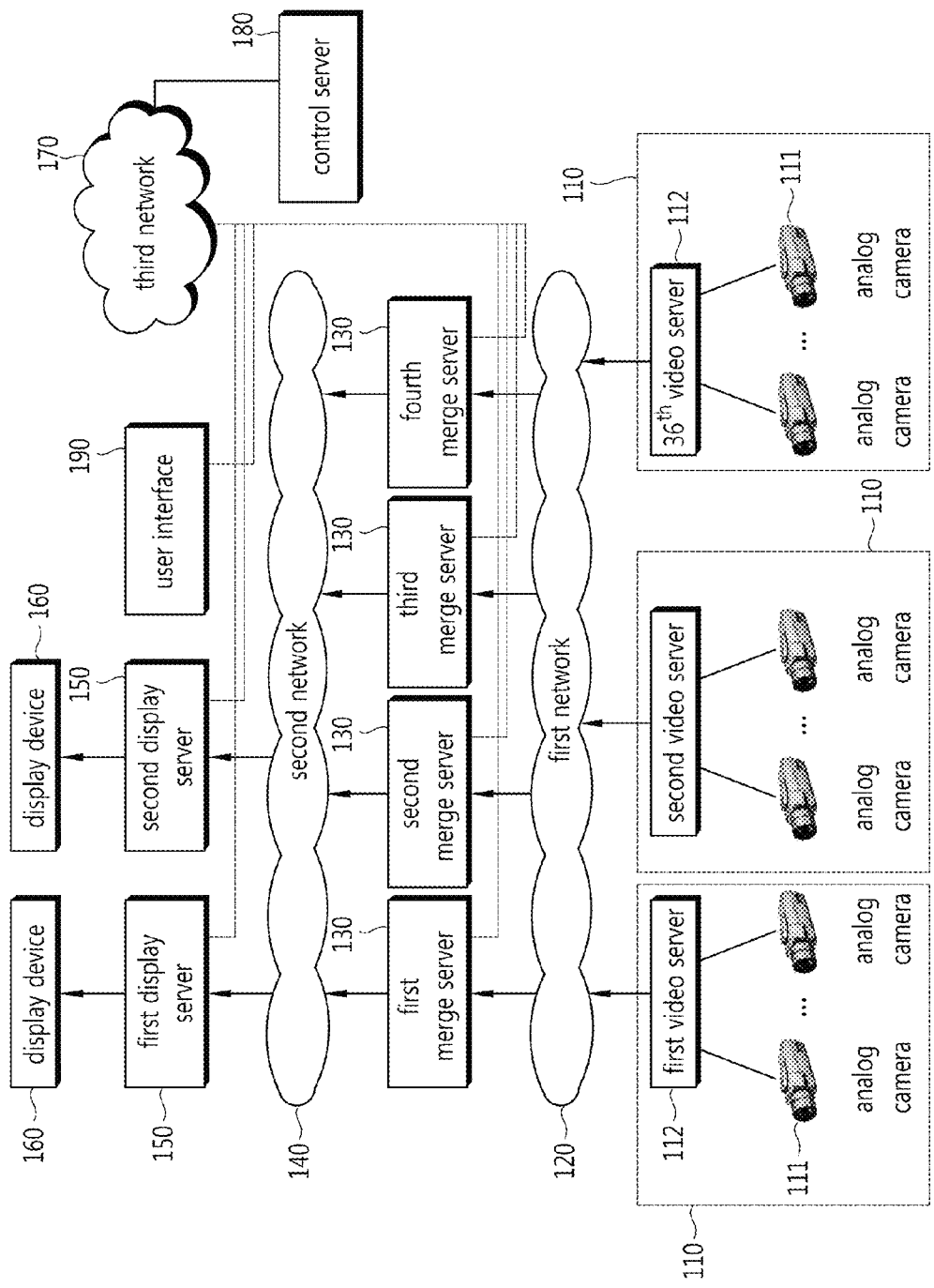
FIG. 1 is a view illustrating a video processing system according to an embodiment of the present invention.

FIG. 1 is a view illustrating a video processing system according to an embodiment of the present invention. As illustrated in FIG. 1, the video processing system may include a video providing unit 110, a merge server 130, a display server 150, a display device 160, a control server 180, and a user interface 190.

The video providing unit 110 serves to provide one or more individual videos to a first network 120. The individual videos refer to a digital video stream encoded by the video providing unit 110 by using any one of MPEG-4, H.264, and VC-1.

The video providing unit 110 may be one or more types of i) IP camera, ii) analog camera 111 and a video server 112, and iii) a certain video server providing video.

An IP camera refers to a camera capturing a video and providing a compressed digital video stream. An IP camera may include an encoder for compressing captured video by using a video compression method such as MPEG-4, H.264, VC-1, or the like. With the encoder, the IP camera may encode a captured video and output an individual video. An IP camera may capture a video with resolution of 640×480, and this is merely an example and higher or lower resolution may be provided.

When the video providing unit 110 is configured to include an analog camera 111 and a video server 112, the analog camera 111 may capture a video at maximum resolution (e.g., 640×480) thereof according to a certain scheme such as NTSC (National Television System Committee), PAL (Phase Alternation by Line system), or the like, and provide an analog video sigma of the captured video to the video server 112. The video server 112 captures the analog video signal and encodes the captured analog video signal by using any one of various video compression methods such as MPEG4, H.264, VC-1, and the like. The video server 112 provides the encoded digital video stream, i.e., the individual video, to the first network 120.

The video providing unit 110 may be configured as a certain video server providing a video. For example, a VOD (Video On Demand) server may be the video providing unit 110.

In the present embodiment, as illustrated in FIG. 1, the video providing unit 110 is configured to include the ii) analog camera 111 and the video server 112, but the present invention is not limited thereto and the devices of i) to iii) may be used together. Also, the video providing unit 110 may be a certain device providing a digital video stream, in addition to the foregoing illustrative function.

"k" ("k" is one of natural numbers) number of video providing units 110 may be provided. In the present embodiment, a case in which "k" is 36 will be described as an example. One or more analog cameras 111 may be connected to the video server 112. The number of analog cameras 111 connected to the video server 112 may vary depending on capacity and a configuration of the video server 112. For example, when the video server 112 has four input terminals, four analog cameras 111 may be connected to the video server 112. In this case, the video server 112 may receive analog video signals from the four analog cameras 111, encode the received analog video signals, and output four individual videos to a single output terminal. In the present embodiment, four analog cameras 111 are connected to a single video server 112, and since thirty-six video servers 112 are provided, the analog cameras 111 totals a hundred and forty four ones. However, the present invention is not limited thereto and a greater or fewer number of analog cameras 111 may be provided. In the present embodiment, the respective video providing units 110 may provide four individual videos to the first network 120.

The first network 120 refers to a network connecting the video providing unit 110 and the merge server 130. The first network 120 may be implemented by any one of various schemes, e.g., wired/wireless schemes such as LAN, WLAN (Wireless LAN), and the like.

The first network 120 includes a first network switch (not shown) to allow different video servers 112 to provide individual videos to different merge servers 130. The first network switch may be implemented as a multi-switch to simultaneously connect a plurality of video servers 112 to a single merge server 130.

The merge server 130 serves to decode individual videos provided from the video server 112, encode the same according a predetermined method to generate a preliminary video, and provide the generated preliminary video to the display server 150. The preliminary video is a video stream encoded by adjusting an amount of data of individual videos, which includes a first preliminary video and a second preliminary video. The preliminary video is generated according to an output control signal provided by the control server 180. Also, the merge server 130 may generate a different preliminary video from the second preliminary video.

One or more merge servers 130 may be provided. In the present embodiment, a case in which four merge servers 130 are provided will be described as an example. Each merge server 130 may be provided with individual videos from the plurality of video providing units 110 via the first network 120. In the present embodiment, it is assumed that each merge server 130 may be able to receive 36 individual videos and process the same. In this case, each merge server 130 may receive individual videos from nine to thirty six video servers 112. However, the present invention is not limited thereto, and since there may be a limitation in capacity for a single merge server 130 to process and processing capacity required for an overall video processing system may differ, the number of merge servers 130 and capacity that can be processed by each merge may be variously modified.

Figure 2:
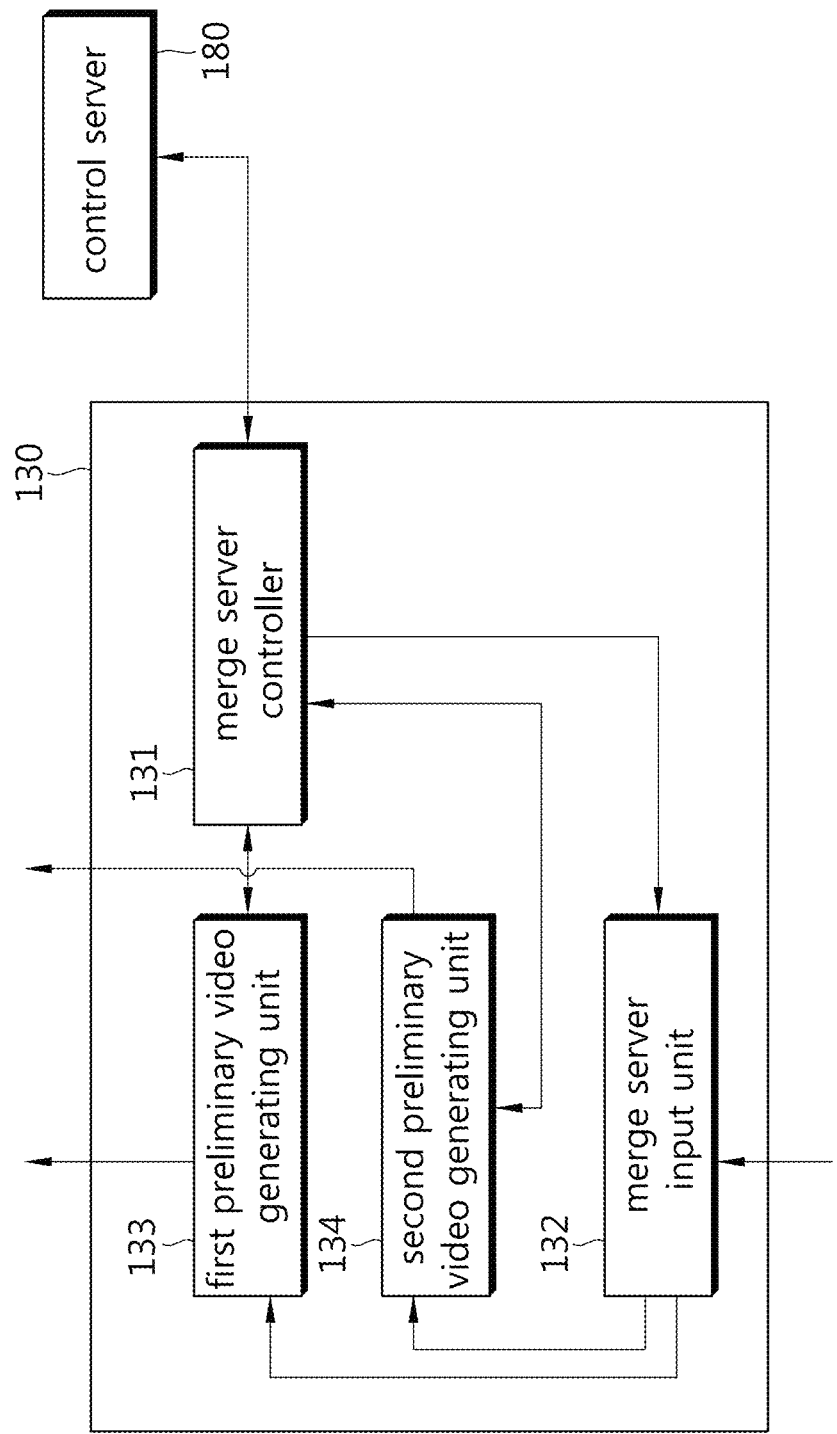
FIG. 2 is a block diagram illustrating a configuration of a merge server according to an embodiment of the present invention.

FIG. 2 is a block diagram illustrating a configuration of a merge server. Referring to FIG. 2, the merge server 130 include a first preliminary video generating unit 133, a second preliminary video generating unit 134, a merge server input unit 132, and a merge server controller 131.

The merge server input unit 132 is an interface for receiving a plurality of individual videos provided from the video server 112. The merge server input unit 132 provides the received individual videos to the first preliminary video generating unit and the second preliminary video generating unit 134. Two or more preliminary video generating units may be provided.

The merge server controller 131 receives an output control signal from the control server 180 and provides a control signal according to the output control signal to allow the first preliminary video generating unit 133 and the second preliminary video generating unit 134 to generate a first preliminary video and a second preliminary video. Also, the control signal selects at least one of the first preliminary video generating unit 133 and the second preliminary video generating unit 134 to output a preliminary video such that it satisfies output conditions of the display device 160.

The first preliminary video generating unit serves to generate a first preliminary video. The first preliminary video is a video stream which includes all of the plurality of individual videos provided from the video server 112 but has been encoded by reducing an amount of data so as to be smaller than the original data amount. Namely, the first preliminary video is generated by encoding all the individual videos received by the merger server 130. Here, the first preliminary video may be encoded to have the same frame rate as that of the plurality of individual videos but lower resolution.

The second preliminary video generating unit 134 serves to generate a second preliminary video. The second preliminary video is a video stream obtained by encoding only individual videos displayed on the display device 160, among a plurality of individual videos provided from the video server 112, according to output conditions of the display device 160.

Namely, the second preliminary video is obtained by encoding only the individual videos displayed in the display device 160. The first preliminary video and the second preliminary video are provided to the display server 150 and used to configure a final video.

The first preliminary video and the second preliminary video may be associated according to various methods so as to be encoded. For example, the methods may include 1) a method of merging individual videos and subsequently encoding the merged videos, 2) a method of encoding the respective individual videos at different degrees of resolution, 3) a method of encoding the respective individual videos by applying scalability thereto, and 4) a method of bypassing the respective individual videos to send them as is, if necessary.

A case of generating the first preliminary video and the second preliminary video according to the method 1) will be described. The first preliminary video generating unit 138 first receives a plurality of individual videos, e.g., thirty six individual videos, and decodes them. When output conditions are a request for merging all of the thirty six individual videos, the first preliminary video generating unit 138 merges the decoded thirty six individual videos into a single merged video M. However, the merged video M may be implemented in various forms and methods according to output conditions.

FIG. 3 is a view illustrating the merged video M. As illustrated in FIG. 3, the merged video M may have a mosaic view in which the thirty six individual videos are merged. In addition to the mosaic view, the merged video M may be configured to have various other dispositions or forms according to output conditions. The first preliminary video generating unit 133 encodes the merged video M through MPEG4, H.264, VC-1, or the like, to generate a first preliminary video. Here, when resolution of the individual videos is, for example, 640×480, each (e.g., video indicated by C1 or C2) of the thirty six videos included in the merged video may have lower resolution (e.g., 160×120). However, in a merged video of a different disposition and form other than the mosaic view video, the thirty six videos may be displayed at maximum resolution.

The second preliminary video generating unit 135 generates a second preliminary video according to a control signal from the merge server controller 131. The control signal is determined according to an output control signal from the control server 180. Resolution of the second preliminary video may be lower than that of each video (e.g., C1 or C2) included in the first preliminary video.

According to the method 1), since the merge server 130 merges the thirty six individual videos into the single merged video M and encodes the merged video M, an amount of data is reduced, in comparison to the case in which the thirty six individual videos are separately encoded. The reason is because, in the case in which the respective individual videos are encoded through MPEG4, H.264, VC-1, or the like, video data is encoded by packet, and in this case, a head part is added to each packet. Thus, since additional information is added, the overall data amount is increased.

When the first preliminary video and the second preliminary video are generated according to the method 2), the first preliminary video generating unit 133 receives thirty six individual videos having predetermined resolution and decodes them. In this case, the first preliminary video generating unit 133 may separately encode the respective individual videos such that they have resolution lower than or higher than the predetermined resolution, and subsequently provide the same to a second network 140. For example, when the predetermined resolution is 640×480, the first preliminary video generating unit 133 may encode the individual videos such that they have resolution within the range of 160×120 to 640×480 and output the same to the second network 140. Or, when the predetermined resolution is 160×120, the first preliminary video generating unit 133 may encode the individual videos such that they have resolution within the range of 160×120 to 640×480 and output the same to the second network 140.

The second preliminary video generating unit 134 generates a second preliminary video according to a control signal from the merge server controller 131. The control signal is determined according to an output control signal from the control server 180. When additional data with respect to at least any one of the thirty six individual videos is requested by the control server 180, the second preliminary video generating unit 134 may encode the corresponding individual videos to have higher resolution to generate a second preliminary video. Conversely, in a case in which one or more particular individual videos are output at resolution lower than that of the original thereof, the second preliminary video generating unit 134 may encode the particular individual videos to have lower resolution to generate a second preliminary video.

For example, the first preliminary video generating unit 133 encodes thirty six individual videos at resolution of 160×120 and provides the same, and here, a second preliminary video having resolution of 320×240 may be generated from a certain number of individual videos requested among the thirty six individual videos.

According to the method 2), the display server 150 may be provided with only a preliminary video including a desired individual video from a plurality of merge server 130. For example, when videos required for the display server 150 are individual videos provided from the video providing unit 110, since a preliminary video including the corresponding individual videos is received separately from different merge servers 130, it is advantageous.

In a case in which the first preliminary video and the second preliminary video are generated according to the method 3), the first preliminary video generating unit 133 and the second preliminary video generating unit 134 may receive thirty six individual videos having resolution of 640×480, encode them according to an SVC (Scalable Video Coding) scheme, and provide the same to the second network 140. Here, the SVC refers to a coding method including a multi-layer structure having a base layer and a plurality of enhanced layers. The first preliminary video generating unit provides data included in the base layer, as a first preliminary video, and the second preliminary video generating unit 134 provides data of an enhanced layer with respect to an individual video requested by the control server 180, as a second preliminary video.

According to the method 4), the merge server 130 may not generate a preliminary video, and may provide a video as it is to the second network 140 as necessary.

Using any one of the foregoing methods, the merge server 130 may transmit at least any one of the first preliminary video and the second preliminary video to the display server 150 via the second network 140, or may transmit a video without generating a preliminary video.

The second network 140 refers to a network connecting the merge server 130 and the display server 150. The second network 140 may be implemented in various manners. The second network 140 may have a second network switch (not shown) to allow different merge servers 130 to provide a preliminary video to different display servers 150. The second network switch may be implemented as a multi-switch to allow a plurality of merge servers 130 to be simultaneously connected to a single display server 150.

The display server 150 may receive at least any one of the first preliminary video and the second preliminary video from the merge server 130 and configure final videos or temporary videos according to output conditions of the display device 160. The display server 150 receives preliminary videos from one or more merge servers 130. In the present embodiment, two display servers 150 are provided, and each of the display servers 150 may receive seventy two individual videos among a total of a hundred and forty four individual videos.

Figure 4:
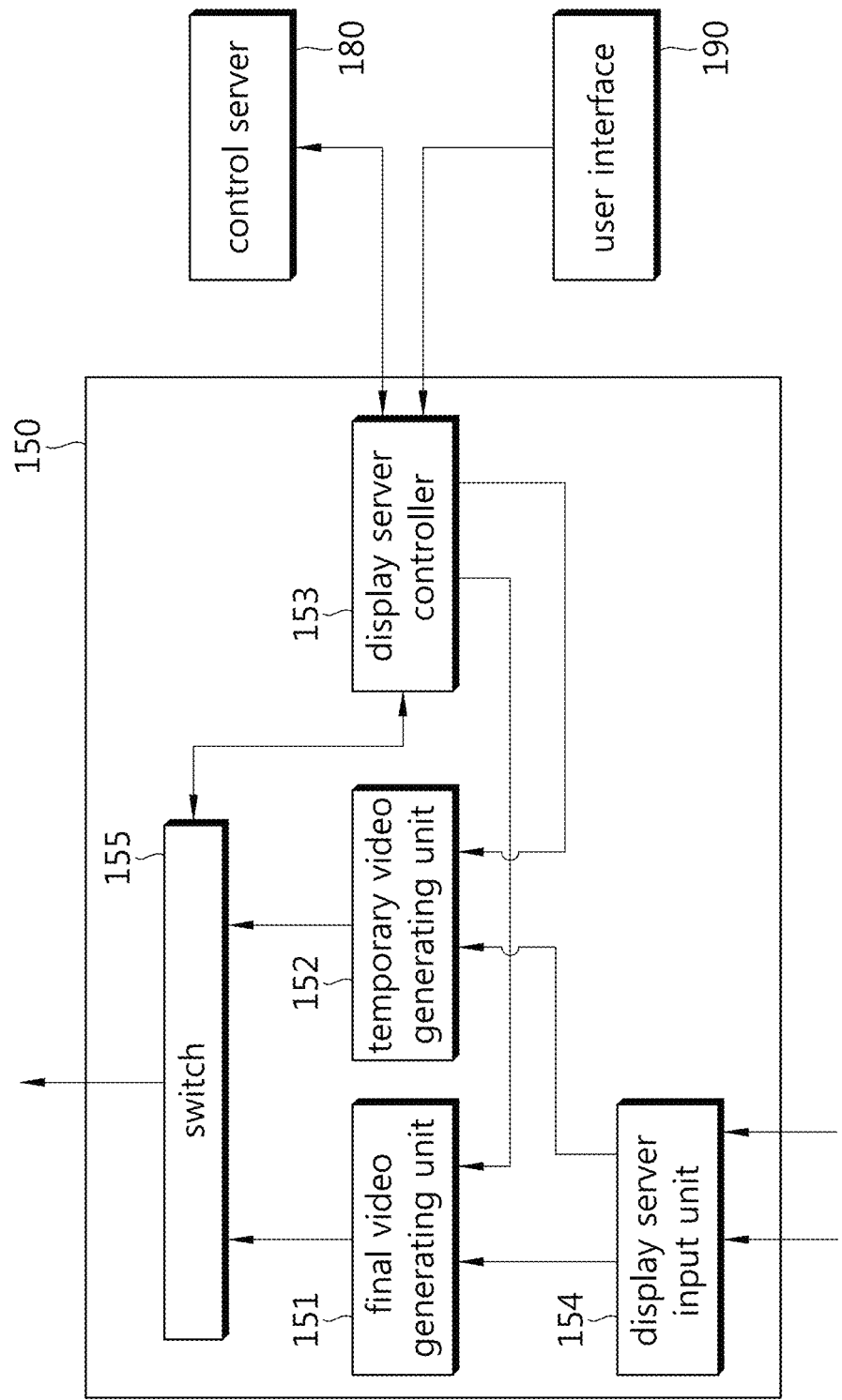
FIG. 4 is a block diagram illustrating a configuration of a display server.

FIG. 4 is a block diagram illustrating a configuration of the display server 150. As illustrated in FIG. 4, the display server 150 includes a final video generating unit 151, a temporary video generating unit 152, a display server controller 153, a display server input unit 154, a switch 155, and a memory unit 156.

The display server input unit 154 is an interface for receiving a preliminary video from the merge server 130 via the second network 140. The display server controller 153 is connected to the control server 180 via a third network, and controls the final video generating unit 151, the temporary video generating unit 152, and the memory unit 156 according to an output control signal. Also, the display server controller 153 performs control to output any one of final videos and temporary videos through a switch 155.

Also, the display server controller 153 separately decodes individual encoded streams provided from the respective merge servers 130 after being encoded, into a YUV color space. A YUV color model is used in many color video standards. The YUV color model is based upon the recognition of the fact that human eyes are sensitive to brightness, relative to a color, in which a color is classified into a Y component denoting luminance and U and V components denoting chrominance. The Y component is sensitive to an error, so more bits than those of U and V are coded. The YUV color model can be represented by data having capacity smaller by about a half than an RGB scheme. However, YUV is not a complete color space but a method for encoding RGB information. Thus, an RGB color space is represented in the actual display device 160.

Meanwhile, the memory unit 156 may be, for example, a graphic memory or a system memory. The memory unit 156 includes a screen-sized YUV surface 230 (please see FIG. 6B). Thus, the display server controller 153 decodes (210) compressed video streams 200 provided from the merge servers 130 into a plurality of individual YUV frames 220 and displays the same in positions or regions of the single YUV surface 230.

Output conditions of the respective YUV frames 220 disposed on the YUV surface 230 are finally set in the display server controller 153 or the control server 130 and applied. Thus, the respective YUV frames 220 disposed on the YUV surface 230 generate a video according to pre-set output conditions. Here, the output conditions are which of the individual videos provided by the plurality of video providing units 110 is to be displayed, in which position it is to be displayed, at which resolution it is to be displayed. For example, the output conditions are which of the individual videos is to be magnified/reduced/panned, zoomed in/out, and the like. However, functions and types of the output conditions are optional. The output conditions may be received through the user interface 190. The user interface 190 may be implemented as a control console including a monitor and a keyboard or may be implemented as a mouse, a touch screen, or the like, connected to the display server 150. Thus, output conditions input through the user interface 190 are provided to the display server 150. Adjustment of the output conditions with respect to the YUV surface 230 is YUV to YUV conversion, so there is not much burden to the display server controller 153 or the control server 180 as hardware. The display server controller 153 and the control server 180 may be a CPU (Central Processing Unit) or a GPU (Graphics Processing Unit).

The final video generating unit 151 generates final videos according to the output conditions of the display device 160. The final videos are an RGB screen buffer 240 which has converted the screen-sized YUV surface 23 into an RGB color space as it is. Thus, for example, the RGB screen buffer 240 may be provided in the system memory or the graphic memory.

The temporary video generating unit 152 generates a temporary video. Here, the temporary video refers to a video temporarily generated by the display server 150 and provided to the display device 160, when output conditions of the display device 160 are changed. The temporary video is a video partially satisfying the changed output conditions. Like the final video generating unit 151, the temporary video generating unit 152 may be data obtained by converting the YUV surface 230 of the memory unit 156 into the RGB color space as it is in the RGB screen buffer 240.

Thus, when the final video generating unit 151 and the temporary video generating unit 152 are implemented as graphic memories, the number of frames to be processed per second in the graphic memories can be significantly reduced. Also, although the number of videos is increased, all the videos can be effectively processed without greatly changing a hardware burden.

Meanwhile, the control server 180 serves to receive the output conditions of the display device 160 from the display server 150 and provide an output control signal to the corresponding merge server 130 according to the output conditions. Namely, the control server 180 serves to control communication between the plurality of merge servers 130 and the display server 150 and synchronize them. The third network 170 may have a control switch (not shown). The control server 180 may be connected to the plurality of display servers 150 and the merge servers 130 through the control switch. Operations among the control server 180, the display server 150, and the merge sever 130 will be described in detail with reference to FIG. 6A.

Here, it is illustrated in FIG. 1 that the merge server 130 and the display server 150 are connected to the control server 180 through the third network 170, but the present invention is not limited thereto. Namely, the control server 180 may not be necessarily configured as a separate server and may exist within the display server 150. In this case, the third network 170 may be unnecessary.

The display device 160 may be connected to the display sever 150 through a DVI (Digital Visual Interface), an RGB cable, and the like, and outputs and displays final videos provided from the display server 150. The display device 160 may be, for example, a monitor, a TV, or the like, having resolution of 1920×1080. A single display device 160 may connected to a single display server 150, and a plurality of display devices 160 may be connected to a single display server 150.

Hereinafter, a video processing method in the video processing system configured as described above will be described. The video processing method will be described with reference to FIG. 5. FIG. 5 is a flow chart illustrating a video processing method according to an embodiment of the present invention.

Analog video signals captured from each position by the analog camera 111 are transmitted to the video server 112. In this case, the analog camera 111 captures a video at maximum resolution and frame rate (frame per second) and provides the same to the video server 112. Namely, in the present embodiment, each analog camera 111 captures a video at maximum resolution of 640×480 and at a predetermined frame rate, and transmits the captured video to the video server 112.

Since four analog cameras 111 are connected to the video server 112, the video server 112 receives four analog video signals. Each video server 112 captures the four analog video signals, encodes them according to any one of various schemes such as MPEG4, H.264, VC-1, and the like, and provides four individual videos to the merge server 130 via the first network. The merge server 130 receives the individual videos from the corresponding video server 112 according to an output control signal from the control server 180 (S10).

The first preliminary video generating unit 133 of the merge server 130 receives thirty six individual videos and generates a first preliminary video. The first preliminary video generating unit 133 provides the first preliminary video to the display server 150 via the second network.

A method of generating the first preliminary video and the second preliminary video has been described by using four methods in describing the video processing system. In the same manner as that of the foregoing process, the first preliminary video is encoded through any one of the four methods. Then, the first preliminary video has an amount of data smaller than that of the thirty six individual videos, so it can be effectively transmitted although a bandwidth of the second network is small. Namely, even when the bandwidth of the second network cannot transmit all the thirty six individual videos at a time, it can transmit the first preliminary video. The second preliminary video generating unit 134 generates a second preliminary video and provides it to the display server 150, only when a corresponding request is received from the control server 180 (S20). In providing the second preliminary video by the second preliminary video generating unit 134, output conditions of the display device 160 may be changed. This will be described in detail with reference to FIG. 6A.

The display sever 150 receives preliminary videos (the first preliminary video or/and the second preliminary video) and decodes the individual encoded streams to a YUV color space, separately. As illustrated in FIG. 6B, the encoded video streams 200 (1, 2, 3, . . . , n) are decoded into a plurality of YUV streams 220 (1, 2, 3, . . . , n).

The respective decoded YUV streams 220 are stored in the screen-sized YUV surface 230 provided in the memory unit 156. The YUV frames 220 which have been encoded and provided are displayed in pre-set positions or regions of the YUV surface 230. Output conditions for the YUV frames 220 with respect to the YUV surface 230 may be set by the display server controller 153 or the control server 180. An adjustment of the output conditions with respect to the YUV surface 230 is made as YUV to YUV conversion. When finally output, the YUV surface 230 is converted into an RGB color space in the RGB screen buffer 240 by the final video generating unit 151 or the temporary video generating unit 151, and finally output to the display device 160 so as to be displayed.

Figure 7A:
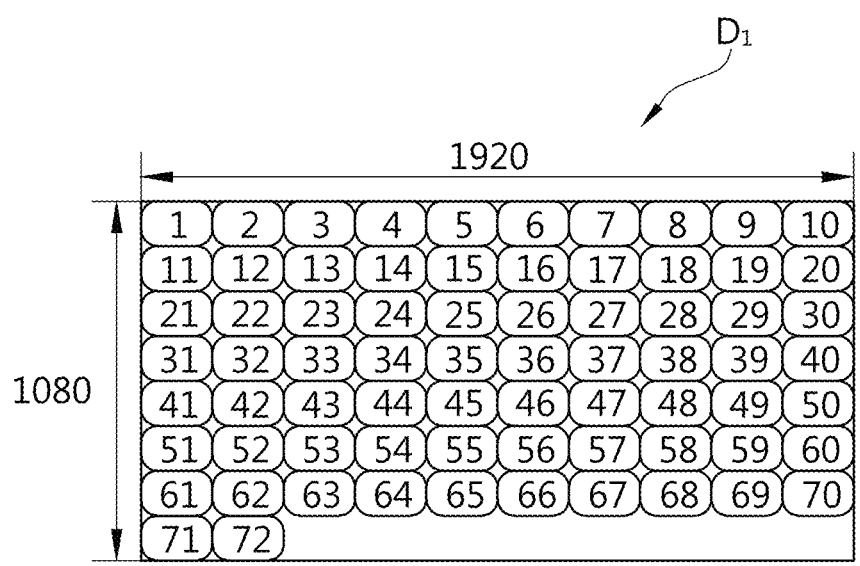
FIGS. 7A and 7B are views illustrating final videos when output conditions are changed to magnify a video 1 in the display device.
Figure 7B:
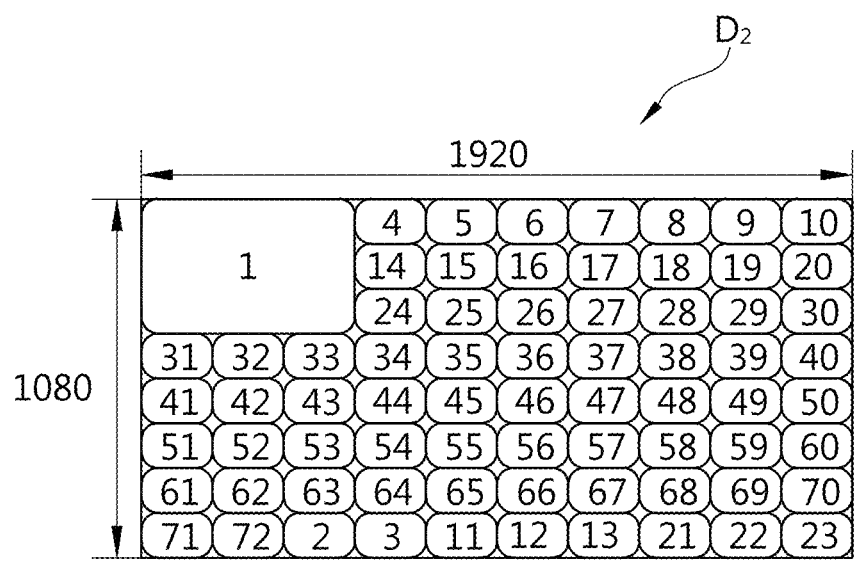

Hereinafter, the operations S20 and S30 of the foregoing video processing method will be described in detail. FIG. 6A is a view illustrating a video processing procedure among the display server 150, the merge server 130, and the control server 180. FIGS. 7A and 7B are views illustrating final videos when output conditions are changed to magnify a video 1 in the display device 160.

Referring to FIGS. 6A, 7A, and 7B, the video providing unit 110 provides a plurality of individual videos to the merge server 130 continuously. The first preliminary video generating unit 133 of the merge server 130 provides a first preliminary video according to the output conditions of the display device 160 to the display server 150 (S31). Then, the final video generating unit 151 of the display server 150 configures final videos by using the first preliminary video and provides the configured final videos to the display device 160 (S32). In this case, the display device 160 may display a final video $D_1$ as illustrated in FIG. 7A, for example. However, the mosaic view like the final video $D_1$ is not necessarily displayed, and the final video $D_1$ may be variously modified.

A case in which a user wants to display a video having high resolution by magnifying the video 1 through the user interface 190 with respect to the display device 160 displaying the final video $D_1$, for example, will be described. In this case, output conditions for displaying by the display device 160 are changed. Finally, the display device 160 may display a final video $D_2$ as illustrated in FIG. 7B.

When the user inputs the changed output conditions such as 'magnifying' through the user interface 190, the user interface 190 provides the changed output conditions to the display server controller 150 of the display server 150 (S33). At this time, the display server controller 153 configures the entire screen with the YUV surface 230, converts the YUV surface 230 into an RGB color space in the RGB screen buffer 240, and provides a temporary video partially satisfying the changed output conditions to the display device 160 (S34).

For example, the display server controller 153 first provides a temporary video obtained by increasing the size of the video 1 of D1 in an upscaling manner, to the display device 160. The temporary video may satisfy the output conditions in terms of the size, but since information regarding the video 1 is not additionally provided, resolution thereof is low. Thus, the temporary video satisfies the changed output conditions only partially.

The display server 150 provides the temporary video to the display device 160 and also provides the changed output conditions to the control server 108 at the same time (S35). In detail, the display server controller 153 provides the changed output conditions to the control server 180.

Then, the control server 180 determines which of individual videos is to be included in a final video according to the changed output conditions, and provides an output control signal to the merge server 130 that provides the corresponding individual video (S36). The output control signal may include, for example, individual video information to be finally output according to the changed output conditions, resolution information, and the like.

In the case of FIGS. 7A and 7B, the controller 180 transmits an output control signal according to the changed output conditions to the merge server 130 that provides the first preliminary video with respect to the video 1.

Meanwhile, if the display server 150 is able to configure a final video satisfying the changed output conditions from the first preliminary video which is already provided, the display server 150 may not transmit the changed output conditions to the control server 180. In this case, the display server 150 only needs to reconfigure a final video satisfying the changed output conditions with the already provided first preliminary video and provide the same to the display device 160. For example, in a case in which an already output final video is the video D2 of FIG. 7B and the magnified video 1 is shifted on the screen of the display device 160, the display server 150 only needs to reconfigure the currently output final video, without having to transmit the changed output conditions to the control server 180.

Referring back to FIG. 6A, the second preliminary video generating unit 134 of the merge server 130 provides additional data with respect to the video 1, as a second preliminary video, to the display server 150 according to an output control signal provided from the control server 180 (S37).

In this process, the first preliminary video and the second preliminary video may be encoded by using 1) a method of merging individual videos and encoding the merged video, 2) a method of encoding respective individual videos to have different resolution, 3) a method of encoding the respective individual videos by applying scalability, and 4) a method of encoding the respective individual videos by applying a method of bypassing and transmitting them as it is.

The methods 1) to 4) are the same as those mentioned above in describing the video processing system.

When the second preliminary video satisfying the changed output conditions is provided from the merge server 130 to the display server 150, the display server 150 reconfigures a final video satisfying the changed output conditions by using the second preliminary video and the first preliminary video and provides the reconfigured final video to the display device 160 (S38). The final video $D_2$ satisfying the changed output conditions to be output by the display device 160 may include the video 1 magnified as illustrated in FIG. 7B and a plurality of other videos. The display server 150 configures such a final video $D_2$.

When the user, who views the display device 160, changes the output conditions through the foregoing process, the user may recognize the video displayed on the display device 160 such that it reacts immediately without a delay time. In the foregoing example, the video 1 is magnified to a video having low resolution for a predetermined time, but the predetermined time is very short for a user' s time recognition system, and after the lapse of the predetermined time, the user may view the video 1 having high resolution.

Figure 8:
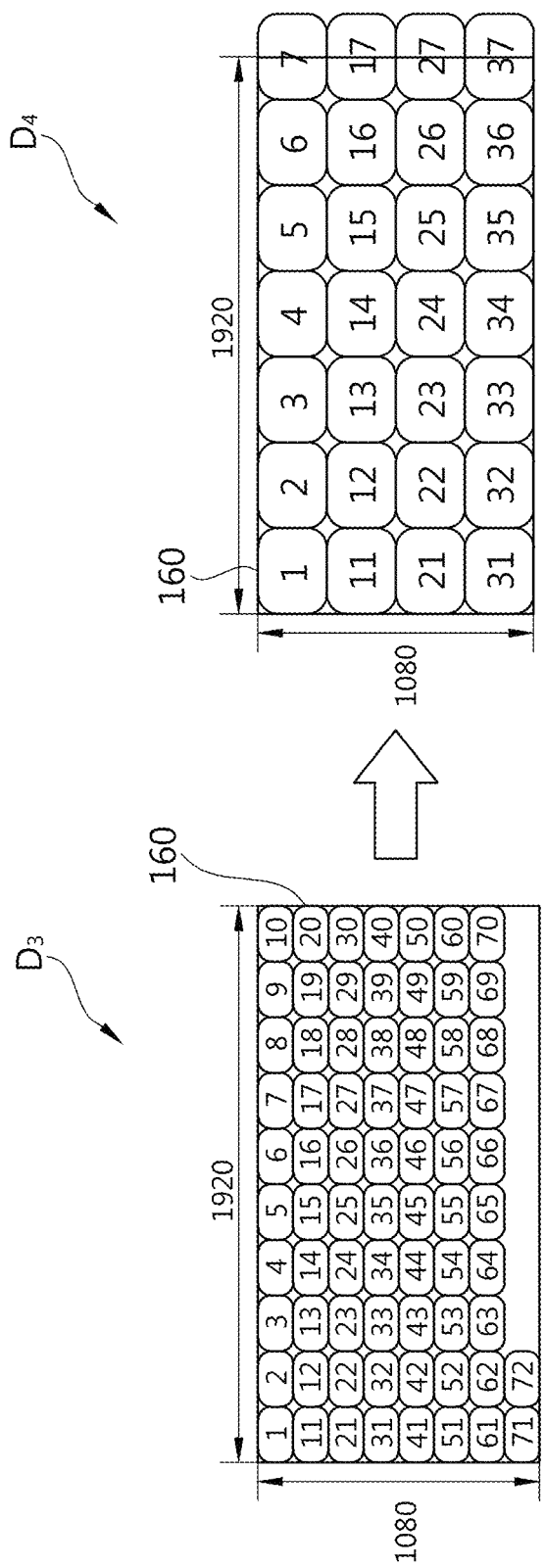
FIG. 8 is a view illustrating a case of magnifying the entirety of final videos in the display device.

Another example of changing output conditions of the display device is illustrated in FIGS. 8 and 9. FIG. 8 is a view illustrating a case of magnifying the entirety of final videos in the display device, and FIG. 9 is a view illustrating a case of panning final videos of the display device.

As illustrated in FIG. 8, seventy two individual videos D3 are displayed as final videos of the display device 160, and in this case, when the entire videos are magnified, videos 1 to 7, 11 to 17, 21 to 27, and 31 to 37 may be displayed (D$_4$) on the display device 160. When the output conditions are changed in this manner, the temporary video generating unit 152 first provides temporary videos partially satisfying the changed output conditions to the display device 160. The temporary videos may be videos obtained by upscaling the individual videos 1 to 7, 11 to 17, 21 to 27, and 31 to 37. The display server controller 153 provides the changed output conditions to the control server 180, and the control server 180 transmits an output control signal to the corresponding merge server 130 according to the changed output conditions.

Then, the second preliminary video generating unit 134 of the corresponding merge server 130 encodes only the individual videos 1 to 6, 11 to 16, 21 to 26, and 31 to 36 input from the video server 112 and provides them as a second preliminary video to the display server 150. In this case, of course, when the first preliminary video is encoded through SVC (Scalable Video Coding), the second preliminary video provides data corresponding to an enhanced layer with respect to a base layer.

Then, the display server 150 reconfigures final videos satisfying the changed output conditions by using the second preliminary video and provides the reconfigured final videos to the display device 160.

The individual videos 7, 17, 27, and 37 in the video D4 are not fully but partially included in the display device 160, and in this case, the display server 150 may upscale the individual videos 7, 17, 27, and 37 included in the video D3 and display the same, rather than receiving the second preliminary video from the merge server 130

A panning process illustrated in FIG. 9 will be described. As illustrated in FIG. 9, twenty four individual videos (1 to 6, 11 to 16, 21 to 26, and 31 to 36) and four individual videos (7, 17, 27, and 37) are partially displayed ($D_5$) as final videos on the display device 160. In this case, four individual videos 7, 17, 27, and 37 may be displayed by first preliminary video and twenty four individual videos (1 to 6, 11 to 16, 21 to 26, and 31 to 36) may be displayed by second preliminary video.

Here, a case in which final videos $D_6$ including twenty individual videos (4 to 8, 14 to 18, 24 to 28, and 34 to 38) and eight partially displayed videos (3, 13, 32, 33, 9, 19, 29, and 39) through panning of the entire videos are displayed on the display device 160 will be described as an example.

When the output conditions are changed as mentioned above, first, the display server 150 provides temporary videos partially satisfying the output conditions of the video $D_6$ to the display device 160. In this case, since he display server 160 has already been provided with first preliminary video with respect to the videos 1 to 72, the display server 150 may upscale the videos 3 to 9, 13 to 19, 23 to 29, and 33 to 39 and provide the same as the temporary videos.

The display server 150 provides the changed output conditions to the control server 180, and the control server 180 transmits an output control signal to the corresponding merge server 130 according to the changed output conditions.

Then, the second preliminary video generating unit 134 of the corresponding merge server 130 generates second preliminary video by encoding only the individual videos displayed on the display device 160, among the individual videos input from the video server 112, such that they satisfy the changed output conditions. Namely, the second preliminary video generating unit 134 generates second preliminary video with respect to only the added individual videos 7, 8, 17, 18, 27, 28, 37, and 38, excluding the individual videos, 2, 11, 12, 21, 22, 31, and 32 not displayed on $D_6$. The second preliminary video generating unit 134 provides the generated second preliminary video to the display server 150. Then, the display server 150 reconfigures final videos satisfying the changed output conditions by using the second preliminary video and the first preliminary video and provides the same to the display device 160.

The individual videos 3, 13, 23, 33, 9, 19, 29, and 39 of the video $D_6$ are not fully but partially included in the display device 160. In this case, the final video generating unit 151 of the display server 150 may upscale the individual videos 3, 13, 23, 33, 9, 19, 29, and 39 by using the first preliminary video to display the same.

As described above, in the case of the video processing system and video processing method according to the present embodiment, the merge serer 130 decodes individual videos provided from the video server 112, and provides a preliminary video encoded according to output conditions of the final videos displayed on the display device 160 to the display server 150.

In this case, among the preliminary videos, the first preliminary video is has resolution lower than that of the individual videos provided from the video server 112, and provided. In this case, as the number of the video providing units 110 is increased, the first preliminary video may be obtained to have lower resolution. Thus, in spite of the limitation in the bandwidth of the second network, a larger number of individual videos can be transmitted. Also, although the number of the video providing units 110 is considerably increased, the display device 160 may be able to display all the individual videos provided by the plurality of video providing units 110 on a single screen.

In the case in which the output conditions of the display device 160 are changed, the merge server 130 transmits the second preliminary video only with respect to the individual videos displayed on the display device 160, and thus, although the number of the video providing units 110 is increased, the display server 150 may be able to process the individual videos. In other words, videos exceeding the processing capacity of the display server 150 are processed through organic cooperation between the merge server 130 and the control server 180.

Referring to the related art video processing system and video processing method, in case of an excessive number of video providing units, videos having low quality are provided by lowering resolution or a frame rate. This is because the server cannot process the video data or a plurality of high quality videos cannot be transmitted due to the problem of a transmission bandwidth of a network. Also, since a plurality of YUV frames are individually converted into RFB frames and output, if there are tens of videos, considerable burden falls on hardware such as a graphic card.

In comparison, in an embodiment of the present invention, desired individual videos can be viewed at maximum resolution/frame rate of video providing units. This is because the merge server 130 transmits video data at maximum resolution/frame rate only for individual videos to be displayed on the display device 160, rather than transmitting all the individual videos at the maximum resolution/frame rate. As a result, an amount of data can be reduced and videos having high resolution/frame rate can be viewed without exceeding a limitation in the bandwidth of a network or computing power of the display server 150. Also, since the YUV surface is converted as it is into the RGB screen buffer, a limitation in hardware capacity can be overcome, and since the number of frames to be processed to output final videos in hardware is minimized, videos can be effectively processed no matter how many they are.

Meanwhile, in another embodiment of the present invention, a screen of the display server and a screen of a user interface of an operating terminal may be synchronized. In this case, the user interface transmits screen output conditions to the display server through the control server, and the display server may request videos from the merge server according to the output conditions. Also, in this case, the user interface itself may also request videos from the merge serer according to output conditions thereof.

What is claimed is:

1. A video processing system comprising:
   a merge server configured to decode a plurality of individual videos provided from video providing units, encode the plurality of individual videos by adjusting an amount of data of each of the individual videos to generate a preliminary video, and provide the preliminary video;
   a display server configured to receive the preliminary video and configure final videos according to output conditions of a display device; and
   a control server configured to receive the output conditions from the display server and transfer an output control signal with respect to the preliminary video to the merge server,
   wherein the display server provides temporary videos partially satisfying changed output conditions of the display device when the output conditions are changed, to the display device, and when a preliminary video satisfying the changed output conditions is provided, the display server reconfigures final videos by using the preliminary video.

2. The video processing system of claim 1, wherein the preliminary video include first preliminary video obtained by encoding all of the plurality of individual videos such that an amount of data is reduced to be smaller than that of the original data, and second preliminary video obtained by encoding only individual videos to be displayed on the display device, among the plurality of individual videos, according to the output conditions of the display device.

3. The video processing system of claim 2, wherein the first preliminary video is obtained by decoding the plurality of individual videos, merging the decode individual videos into a single video, and subsequently encoding the merged video, wherein the videos included in the merged video have resolution lower than that of the plurality of individual videos, and the second preliminary video is obtained by encoding the individual videos such that it has resolution different from that of the videos included in the merged video.

4. The video processing system of claim 2, wherein the first preliminary video is obtained by decoding the plurality of individual videos and subsequently encoding them to have low resolution, and the second preliminary video is obtained by encoding the individual videos to have resolution different from that of the first preliminary video.

5. The video processing system of claim 2, wherein the first preliminary video is data of a base layer obtained by decoding the plurality of individual videos and subsequently encoding them by using SVC (Scalable Video Coding), and the second preliminary video is data of an enhanced layer with respected to the the first preliminary video.

6. The video processing system of claim 1, wherein the video providing units include one or more cameras and a video server receiving videos from the one or more cameras, processing the received videos, and providing individual videos to the merge server.

7. The video processing system of claim 6, wherein one or more video servers are provided, and the video servers are connected to the merge server via a first network.

8. The video processing system of claim 7, wherein one or more merge servers are provided and connected to the display server via a second network.

9. The video processing system of claim 8, wherein one or more display servers are provided, and the display servers and the merge servers are connected to the control server via a third network.

10. The video processing system of claim 1, wherein the display server converts a plurality of video streams provided from the merge server into YUV frames, stores the YUV frames in a screen-size YUV surface, and converts the screen-size YUV surface into an RGB color space in an RGB screen buffer, and output an entire screen.

11. The video processing system of claim 10, wherein the screen-size YUV surface is converted according to the output conditions.

12. A video processing method of a video processing system, the method comprising: receiving a plurality of individual videos from video providing units; encoding the individual videos into a preliminary video according to output conditions of a display device; receiving the preliminary video and configuring final videos according to the output conditions; and displaying the final videos on the display device, wherein the preliminary video includes any one of a first preliminary video obtained by encoding all of the plurality of individual videos such that an amount of data thereof is reduced to be smaller than an amount of the original data and a second preliminary video obtained by encoding only individual videos to be displayed on the display device, among the plurality of individual videos, according to output conditions, wherein in the configuring of the final videos, when the output conditions of the display device are charged, temporary videos partially satisfying the changed output conditions are configured as final videos, and when the second preliminary video according to the changed output conditions is provided, final videos are reconfigured by using the second preliminary video.

13. The method of claim 12, wherein the first preliminary video is obtained by decoding the plurality of individual videos, merging the decode individual videos into a single video, and subsequently encoding the merged video, wherein the videos included in the merged video have resolution equal to or different from that of the plurality of individual videos, and the second preliminary video is obtained by encoding the individual videos such that it has resolution different from that of the videos included in the merged video.

14. The method of claim 12, wherein the first preliminary video is obtained by decoding the plurality of individual videos and subsequently encoding them to have low resolution, and the second preliminary video is obtained by encoding the individual videos to have resolution different from that of the first preliminary video.

15. The method of claim 12, wherein the first preliminary video is data of a base layer obtained by decoding the plurality of individual videos and subsequently encoding them by using SVC (Scalable Video Coding), and the second preliminary video is data of an enhanced layer with respected to the the first preliminary video.

16. The method of claim 12, wherein in the receiving of the preliminary video and configuring final videos according to the output conditions, the plurality of preliminary videos are converted into a YUV color space and stored in a screen-size YUV plane, and after the YUV surface is converted into an RGB color space in an RGB screen buffer, an entire screen is output.

17. The method of claim 16, wherein the screen-size YUV surface is converted according to the output conditions.

* * * * *